S. G. CRANE.
ELECTRIC WATER HEATER.
APPLICATION FILED JULY 19, 1920.

1,437,383.

Patented Nov. 28, 1922.
3 SHEETS—SHEET 1.

Inventor
SAMUEL G. CRANE

By George R. Frye
Attorney

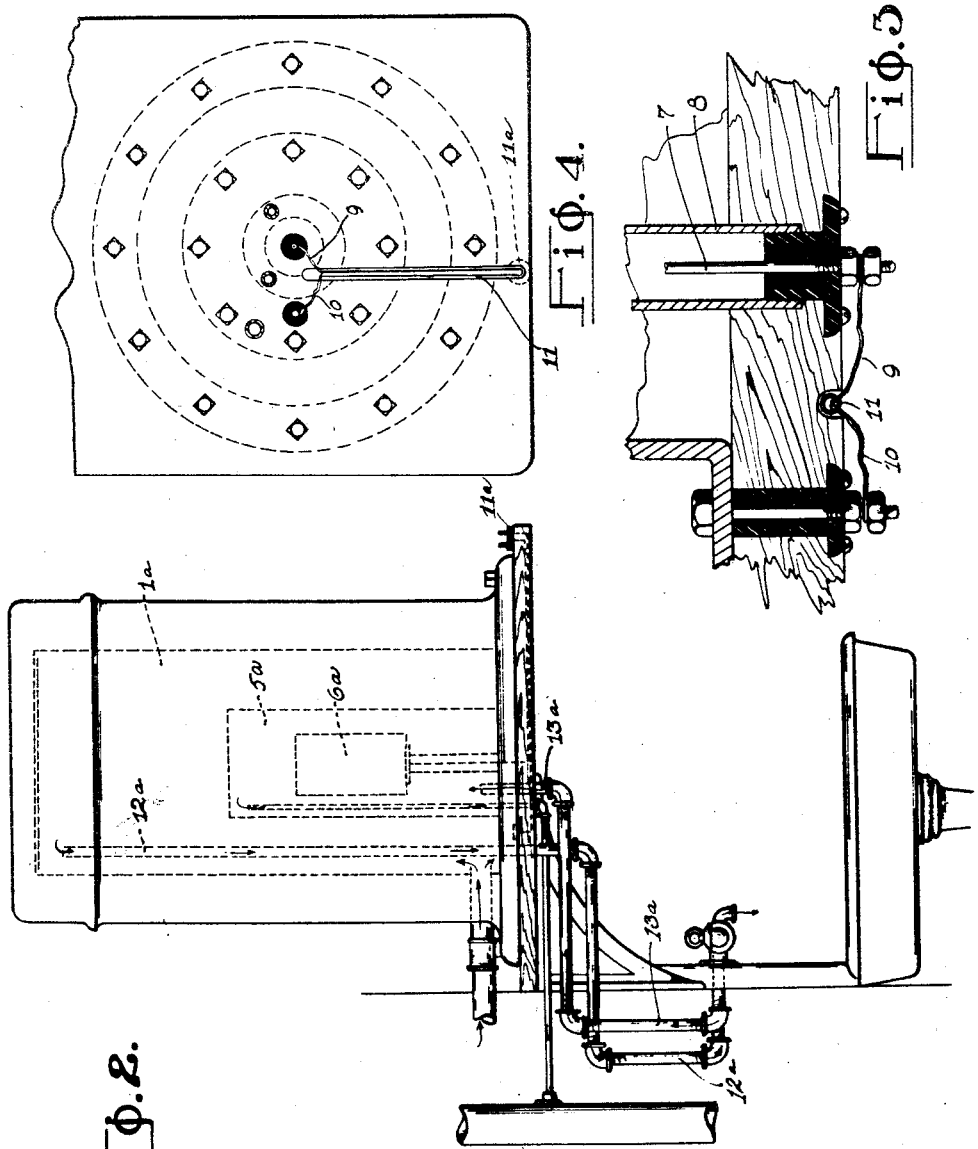

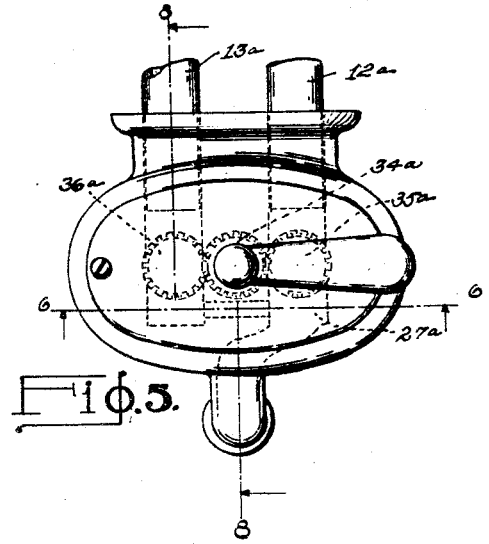
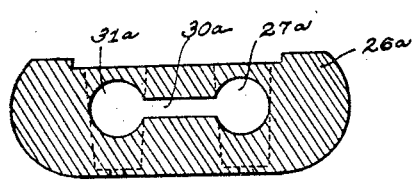
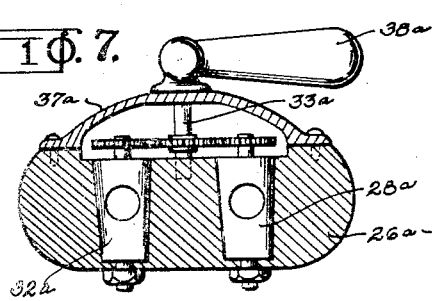
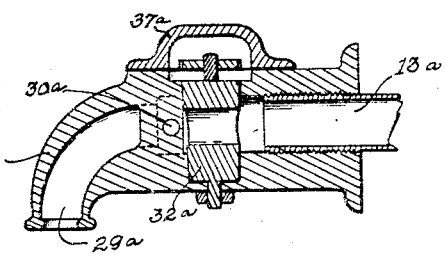
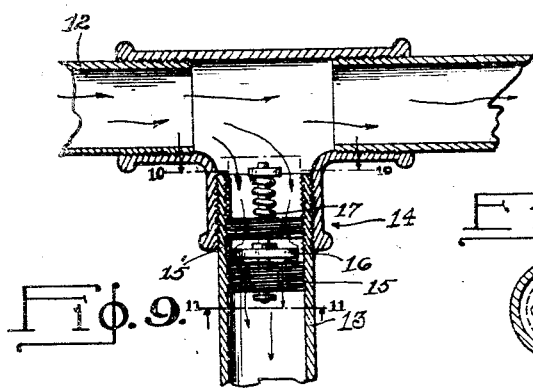
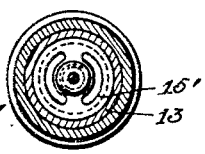
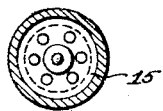

Patented Nov. 28, 1922.

1,437,383

UNITED STATES PATENT OFFICE.

SAMUEL G. CRANE, OF TOLEDO, OHIO.

ELECTRIC WATER HEATER.

Application filed July 19, 1920. Serial No. 397,164.

*To all whom it may concern:*

Be it known that I, SAMUEL G. CRANE, a citizen of the United States, residing at Toledo, in the county of Lucas and State of Ohio, have invented certain new and useful Improvements in Electric Water Heaters, of which the following is a specification.

This invention relates to electric water heaters, and has for its principal object the provision of an apparatus whereby the usual city water can be readily and economically heated in the home or place of business by the usual city current.

A further object is to provide a construction that will prevent the water to be used by the householder from contacting with the heat-producing portion of the apparatus, thereby avoiding any possible contamination.

Another object is to provide means for storing the heated water in readiness for immediate use, replenishing such water as may be drawn off, and utilizing the flowing water both to initiate the passage of the current to generate further heat and to automatically regulate the duration of the current.

Another object is to provide a device whereby resistance to the flow of current through water in a heating chamber is utilized to produce heat, practically all of which is absorbed by the water in a surrounding storage chamber.

Another object is to provide means whereby a predetermined proportion of the flowing water will be admitted to the central heating chamber, wherein the duration of the heating current will be governed by the amount of the water admitted.

Other objects and advantages will be apparent from the following description, in which reference is had to the accompanying drawings illustrating preferred embodiments of my invention and wherein similar reference numerals designate similar parts throughout the several views.

In the drawings:—

Figure 2 is a side elevation of a slightly modified form;

Figure 3 is an enlarged fragmentary sectional view showing the electric connections;

Figure 4 is a bottom plan view of the apparatus shown in Figure 2, the pipes being shown in section;

Figure 5 is a plan view of a faucet employed in the form shown in Figure 2;

Figure 6 is a sectional view through a portion of the faucet, taken substantially on the line 6—6 of Figure 5;

Figure 7 is a vertical sectional view through the faucet, the movable parts being shown in elevation;

Figure 8 is a vertical section on the line 8—8 of Figure 5;

Figure 1:
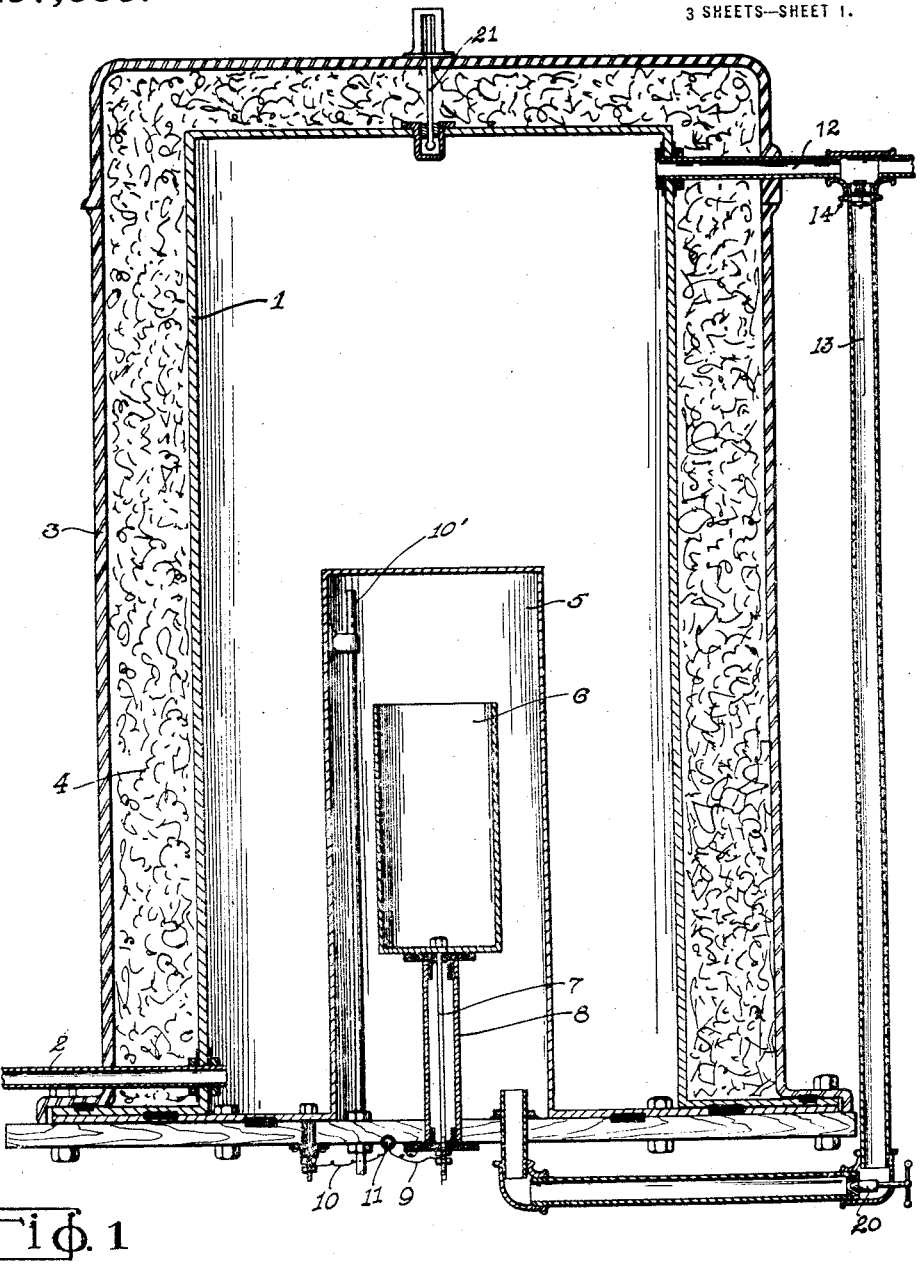
Figure 1 is a vertical sectional view of one form of heating apparatus embodying my invention.

Figure 9 is a sectional view showing an automatic valve employed in the form of apparatus illustrated in Figure 1; and Figures 10 and 11 are sectional views taken substantially on the lines 10—10 and 11—11 of Figure 9.

Referring first to the form shown in Figure 1, the water to be heated is contained in a tank 1 which is connected by means of an inlet pipe 2 to the source of water supply. Surrounding the tank 1 and spaced therefrom is a shell 3, the space between the shell 3 and tank 1 being filled with mineral wool or other material 4 to form a jacket that is substantially non-conductive of heat.

Centrally located within the lower end of the tank 1 is a chamber 5 adapted to contain water, and supported within the chamber 5 at some distance from its bottom is a cup-shaped electrode 6. The electrode 6 is connected, by means of a rod 7 extending downwardly through the insulating supporting tube 8, to a wire 9 leading from one pole of the source of current, while the wall of the chamber 5 is connected to the wire 10 leading to the other pole of the source of current. For convenience in installing the apparatus, the wires 9 and 10 may advantageously extend through a tube 11 to a conveniently-located plug or socket 11ª. When the current is switched on while the chamber 5 contains sufficient water to submerge the electrode 6 or a portion thereof, the current passes through the water from the wall of the chamber 5 to the electrode, or vice versa, according to its direction, and due to the resistance offered by the water to the passage of the current, considerable heat is liberated, which readily passes through the walls of the chamber 5 and raises the temperature of the surrounding water in the tank 1.

As the water in the chamber 5 is heated, rapid evaporation takes place, and, at times, the water is also rapidly decomposed by electrolytic action, hydrogen and oxygen being liberated. The products of decomposition and evaporation rise into the upper end of the chamber 5, from whence they are discharged through a pipe 10' connecting with a waste pipe of the usual plumbing system in houses. As the water is evaporated and decomposed, its level in the chamber 5 falls until it passes the lower end of the electrode 6, whereupon the circuit is automatically broken. The water in the tank 1 has in the meantime been highly heated, and, due to the surrounding jacket of non-conducting material, its temperature remains substantially constant for a long period of time so that it constitutes a reservoir of hot water always ready for use.

From the upper end of the tank 1 an outlet pipe 12 leads to hot water faucets, which may be positioned above the sink, bath tub, and in other convenient locations so that hot water may be drawn from the tank when needed.

A pipe 13 leads from the outlet pipe 12 to the interior of the heating chamber 5 and is provided with an automatic check valve 14 consisting of a perforated plate 15 threaded into the pipe 13, as shown in Figures 9 and 11, and a valve head 16 adapted to close the perforations when seated. An upper perforated disc 15' serves as a guide for the valve stem and limits the movement of the valve. A coil spring 17 surrounding the valve stem tends to lift the valve head from the plate 15, but this tendency is normally overcome by the pressure of the water, which forces the valve to seat against the tension of the spring. When the faucet is opened to draw water from the tank 1, the usual pressure is partially relieved and the spring may therefore lift the valve and allow a small amount of water to enter the chamber 5, whereby the level of the water therein is again raised above the lower end of the electrode 6 so that the heating circuit is again closed.

It is obvious that the level of the water in the chamber 5 is raised to an extent that is substantially proportional to the time the faucet is open and hence substantially proportional to the amount of water drawn from the tank 1. The more water that is drawn from the tank 1, the longer the heating current flows subsequently. The current is therefore automatically maintained a sufficient time in each instance after the water has been withdrawn to re-heat the water in the tank 1, the temperature of which has been lowered by the influx of unheated water from the source of water supply.

The rate at which water enters the chamber 5 may be further controlled by means of a manually operable valve 20 in the pipe 13. If the current employed is alternating, the decomposition of the water in the chamber 5 will proceed very slowly, but the heating effect of passing the current through the water, and therefore the rate of evaporation, will be substantially the same as is the case with direct current of the same voltage and amperage. The valve 20 may, therefore, be more nearly closed when alternating current is used than when the current employed is direct. The water pressure is also a factor which enters into the proper positioning of the valve 20. This valve may, if desired, be kept closed except when water is to be admitted to the chamber 5, and when the valve 20 is so operated, the automatic valve 14 may be dispensed with.

The temperature of the water in the tank 1 may thus be kept at a substantially uniform temperature with the consumption of but little current. After the tank is first heated, the heat dissipates very slowly, and the cup-shaped electrode 6 in the chamber 5 stores hot water that replaces that given off by the water in the tank 1. When only a small quantity of water is drawn off from the tank 1 the inflowing cool water lowers the temperature of the mass only slightly, and very little additional current is needed to raise the water in the tank to its previous high temperature. The more water is drawn off from the tank 1, the more water is supplied to the central heating chamber 5 and the longer the current flows to reheat the tank, the consumption of current being governed entirely by the consumption of hot water.

A thermometer 21 suitably mounted with its bulb in the upper end of the tank 1 indicates the temperature of the water, and further serves to indicate whether or not the apparatus is functioning properly.

The conductivity of the water supplied for domestic use in most places is approximately right for efficient operation of the apparatus. Should, however, the water be of such purity as to offer undue resistance to the passage of the current or prevent its passage, it may be supplied with soluble salts or other substances by placing a sufficient quantity thereof to last for an extended period within the cup-shaped electrode 6 so that a small portion will be taken up by the water in the chamber 5. In such instances it is preferred to perforate the bottom portion of the cup.

The form shown in Figure 2 differs from that shown in Figure 1 principally in the means employed for replenishing the supply of water in the inner heating chamber. The outlet pipe 12ª, which in this form is not provided with a check valve, extends from the upper part of the tank downwardly through the bottom and leads to a faucet having a by-pass through which a part of the water drawn from the tank 1ᵃ is directed into the inner chamber 5ᵃ through a return pipe 13ᵃ. A faucet of this type is illustrated in Figures 5 to 8 inclusive, where the outlet pipe 12ᵃ is shown as terminating in a block 26ᵃ having a passage 27ᵃ within which is a valve 28ᵃ, which when open leads to the mouth 29ᵃ of the faucet. The portion of the passage 27ᵃ adjacent the mouth of the faucet is somewhat constricted, and a by-pass is provided through a bore 30ᵃ extending laterally from between the constricted portion and the valve 28ᵃ to a second passage 31ᵃ which contains a valve 32ᵃ leading, when open, to the return pipe 13ᵃ. Fixed upon the vertical shaft 33ᵃ, the lower end of which is journaled in the block 26ᵃ, is a pinion 34ᵃ which meshes with similar pinions 35ᵃ and 36ᵃ fixed respectively to the valves 28ᵃ and 32ᵃ so that the valves are geared together to open and close simultaneously. The mechanism of the faucet is covered by a cap 37ᵃ through which the upper end of the shaft 33ᵃ projects, and the projecting end of the shaft is provided with an operating handle 38ᵃ.

When the valves 28ᵃ and 32ᵃ are opened to draw water from the tank 1ᵃ, most of the water is discharged through the mouth 29ᵃ, but a small part of the stream is diverted through the bore 30ᵃ, the valve 32ᵃ, and the return pipe 13ᵃ into the chamber 5ᵃ. The amount of water which is thus supplied to the chamber 5ᵃ is obviously approximately proportional to the amount of water withdrawn from the tank 1ᵃ, and the quantity of reheating current that is consumed before the water level again falls below the electrode 6ᵃ is therefore also proportional to the amount of water withdrawn from the tank and consequently to the amount of cold water which enters the tank to replace that withdrawn.

The proportion of water delivered to the chamber 5ᵃ may be regulated by a valve similar to the valve 20 shown in Figure 1.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In an electric water heater, means for storing water to be heated, means for electrically heating the stored water, means for withdrawing and replacing the stored water, and means whereby the quantity of water withdrawn will regulate the duration of the heating action.

2. In an electric water heater, means for storing water to be heated, means for electrically heating the stored water, means for withdrawing and replacing the stored water, and means whereby the water withdrawn will initiate the passage of the current and regulate the duration of the heating action.

3. In an electric water heater, means for storing water to be heated, means for electrically heating the stored water, means for withdrawing and replacing the stored water, and means whereby a portion of the flowing water will be diverted to regulate the duration of the heating action.

4. In an electric water heater, means for storing water to be heated, means for electrically heating the stored water, means for withdrawing and replacing the stored water, and means whereby a portion of the flowing water will be diverted to initiate the passage of the current and regulate the duration of the heating action.

5. In an electric water heater, a storage reservoir for water to be heated, a heating chamber, means for electrolyzing water in the heating chamber, means for withdrawing and replacing the stored water, and means whereby a portion of the flowing water will be conveyed to the heating chamber to regulate the duration of the electrolytic action.

6. In an electric water heater, a storage reservoir for water to be heated, a heating chamber, means for electrolyzing water in the heating chamber, means for withdrawing and replacing the stored water, and means whereby a portion of the flowing water will be conveyed to the heating chamber to initiate and regulate the duration of the electrolytic action.

7. In an electric water heater, a storage reservoir, a heating chamber, a pair of spaced electrodes in the heating chamber, an electric circuit connecting with the electrodes and adapted to be closed through water between the electrodes, means for admitting water to the reservoir, means for withdrawing water therefrom, and means for conveying a portion of the flowing water into the space between the electrodes.

8. In an electric water heater, a storage reservoir, a heating chamber, a pair of spaced electrodes in the heating chamber, an electric circuit connecting with the electrodes and adapted to be closed through water between the electrodes, means for admitting water to the storage reservoir, means for withdrawing water therefrom, and means for conveying a proportional amount of the flowing water into the space between the electrodes.

9. In an electric water heater, a storage reservoir, a heating chamber, a pair of spaced electrodes in the heating chamber, an electric circuit connecting with the electrodes and adapted to be closed through water between the electrodes, means for admitting water to the storage reservoir, means for withdrawing water therefrom, and means for conveying a portion of the withdrawn water into the space between the electrodes.

10. In an electric water heater, a storage reservoir, a heating chamber, a pair of spaced electrodes in the heating chamber, an electric circuit connecting with the electrodes and adapted to be closed through water between the electrodes, means for admitting water to the storage reservoir, means for withdrawing water therefrom, and means for conveying a proportional amount of the withdrawn water into the space between the electrodes.

11. In an electric water heater, a storage reservoir, a heating chamber, a pair of spaced electrodes in the heating chamber, one of which is raised above the bottom of the other, an electric circuit connecting with the electrodes and adapted to be closed through water between the electrodes, means for admitting water to the storage reservoir, means for withdrawing water therefrom, and means for conveying a portion of the flowing water to the heating chamber to raise the water up to the space between the electrodes.

12. In an electric water heater, a storage reservoir, a heating chamber, a pair of spaced electrodes in the heating chamber, one of which is raised above the bottom of the other, an electric circuit connecting with the electrodes and adapted to be closed through water between the electrodes, means for admitting water to the storage reservoir, means for withdrawing water therefrom, and means for conveying a proportional amount of the flowing water to the heating chamber to raise the water up to the space between the electrodes.

13. In an electric water heater, in combination, a reservoir for storing water, means for heating such water, comprising a chamber containing a pair of electrodes and adapted to contain water, means for withdrawing water from said reservoir, and means for forcing a portion of the water so withdrawn into said chamber to act as resistance between said electrodes.

14. In an electric water heater, in combination, a reservoir for containing water under pressure, a heating chamber therefor, a passage from said reservoir to said chamber, a pressure-controlled valve within said passage adapted to admit water to said chamber when the pressure in said reservoir is reduced, an outlet for said reservoir, and a manually-operable valve in said outlet.

15. In an electric water heater, in combination, a reservoir for containing water under pressure, a heating chamber therefor, a passage from said reservoir to said chamber, a valve within said passage arranged to be closed by the pressure of water in said reservoir, a spring for opening said valve, an outlet for said reservoir, and a manually-operable valve in said outlet.

16. In an electric water heater, in combination, a reservoir for containing water under pressure, a heating chamber therefor, a passage from said reservoir to said chamber, a valve in said passage comprising a perforated seat, a valve head adapted to be forced against said seat by the pressure of water in said reservoir, a spring tending to move said valve head away from said seat, an outlet for said reservoir and a manually-operable valve in said outlet.

17. In an electric water heater, in combination, a reservoir, a heating chamber in said reservoir, an outlet from said reservoir terminating in a faucet, a passage from said faucet to said chamber, and valve mechanism in said faucet for directing a portion of the water from said outlet into said chamber.

18. In an electric water heater, in combination, a reservoir, a heating chamber, an outlet pipe for said reservoir, a faucet connected to said outlet pipe, said faucet having a main and an auxiliary passage, a feed pipe leading from said auxiliary passage to said chamber, and interconnected valves in said main and auxiliary passages whereby a portion of the water withdrawn from said reservoir is diverted into said feed pipe.

SAMUEL G. CRANE.